(12) United States Patent
Han et al.

(10) Patent No.: US 11,414,133 B2
(45) Date of Patent: Aug. 16, 2022

(54) CENTER PILLAR ASSEMBLY FOR A VEHICLE

(71) Applicants: HYUNDAI MOTOR COMPANY, Seoul (KR); KIA MOTORS CORPORATION, Seoul (KR)

(72) Inventors: Min Uke Han, Gwangmyeong-si (KR); Sun Kyu Kim, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 315 days.

(21) Appl. No.: 16/593,339

(22) Filed: Oct. 4, 2019

(65) Prior Publication Data

US 2020/0324825 A1 Oct. 15, 2020

(30) Foreign Application Priority Data

Apr. 10, 2019 (KR) .................. 10-2019-0041964

(51) Int. Cl.
*B62D 25/04* (2006.01)
*B60R 22/24* (2006.01)
*B62D 27/02* (2006.01)

(52) U.S. Cl.
CPC ............. *B62D 25/04* (2013.01); *B60R 22/24* (2013.01); *B62D 27/023* (2013.01)

(58) Field of Classification Search
CPC ..... B62D 25/04; B62D 27/023; B62D 21/157; B60R 22/24
USPC ...................................... 296/193.06, 187.12
See application file for complete search history.

(56) References Cited

U.S. PATENT DOCUMENTS

| 8,608,233 | B2 | 12/2013 | Mori |
| 9,630,651 | B1 | 4/2017 | Baccouche |
| 2012/0119477 | A1 | 5/2012 | Kim |

FOREIGN PATENT DOCUMENTS

| JP | 2002053068 | A | | 2/2002 | |
| JP | 2005247002 | A | | 9/2005 | |
| KR | 20120040778 | A | * | 4/2012 | ............. B60R 22/24 |
| KR | 101210086 | B1 | | 12/2012 | |

* cited by examiner

*Primary Examiner* — Dennis H Pedder
(74) *Attorney, Agent, or Firm* — Lempia Summerfield Katz LLC (57) ABSTRACT

A center pillar assembly for a vehicle includes: an outer reinforcement coupled to a side outer body of a vehicle body; an inner reinforcement coupled to the outer reinforcement, the inner reinforcement having an upper section and a lower section; a seat belt upper mounting bracket coupled to the upper section of the inner reinforcement; and a seat belt lower mounting bracket coupled to the lower section of the inner reinforcement. At least a portion of the inner reinforcement has a W-shaped cross-section.

9 Claims, 7 Drawing Sheets

CENTER PILLAR ASSEMBLY FOR A VEHICLE

CROSS-REFERENCE TO RELATED APPLICATION

This application is based on and claims the benefit of priority to Korean Patent Application No. 10-2019-0041964, filed on Apr. 10, 2019, in the Korean Intellectual Property Office, the disclosure of which is incorporated herein in its entirety by reference.

TECHNICAL FIELD

The present disclosure relates to a center pillar assembly for a vehicle, and more particularly, to a center pillar assembly for a vehicle capable of improving impact stiffness and roof strength.

BACKGROUND

A center pillar for a vehicle is designed to maintain stiffness of a vehicle body and improve crash performance and roof strength to protect occupants.

A center pillar assembly includes a pillar outer panel facing the exterior of the vehicle body and a pillar inner panel facing the interior of the vehicle body.

In a center pillar assembly according to the related art, a reinforcing member for improving crash performance and roof strength is mounted between the pillar outer panel and the pillar inner panel. A plurality of brackets, on which a seat belt is mounted, is disposed between the pillar outer panel and the pillar inner panel.

The center pillar assembly according to the related art requires a relatively large number of components such as the pillar outer panel, the pillar inner panel, the reinforcing member, and the plurality of brackets. An assembly structure of such a center pillar is complicated. Thus, the center pillar assembly according to the related art may have a complicated manufacturing process and may increase manufacturing cost. For example, a flange of the pillar outer panel, a flange of the pillar inner panel, a flange of the reinforcing member, and a flange of the bracket are overlapped and welded in four layers. This makes the welded structure complicated, degrades welding quality, and reduces workability and air-tightness of door weather strips.

The above information described in this background section is provided to assist in understanding the background of the inventive concept. The background section may include any technical concept which is not considered as the prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a center pillar assembly for a vehicle. The center pillar assembly is capable of reducing the number of components to reduce the number of welds and simplify a welded structure and is capable of improving impact stiffness and roof strength.

According to an aspect of the present disclosure, a center pillar assembly for a vehicle may include an outer reinforcement coupled to a side outer body of a vehicle body and an inner reinforcement coupled to the outer reinforcement. The inner reinforcement may include an upper section and a lower section. The center pillar assembly may also include a seat belt upper mounting bracket coupled to the upper section of the inner reinforcement and a seat belt lower mounting bracket coupled to the lower section of the inner reinforcement. At least a portion of the inner reinforcement may have a W-shaped cross-section.

A first closed cross-section cavity and a second closed cross-section cavity may be disposed between the upper section and the outer reinforcement. A third closed cross-section cavity and a fourth closed cross-section cavity may be disposed between the lower section and the outer reinforcement. The third closed cross-section cavity may be continuous with respect to the first closed cross-section cavity. The fourth closed cross-section cavity may be continuous with respect to the second closed cross-section cavity.

The upper section and the lower section may form a unitary one-piece structure in a longitudinal direction of the inner reinforcement.

The upper section and the lower section may be two separate pieces.

The outer reinforcement may have a hat-shaped cross-section, the upper section may have a W-shaped cross-section, and the lower section may have a W-shaped cross-section.

The outer reinforcement may have a hat-shaped cross-section, the upper section may have a W-shaped cross-section, and the lower section may have a hat-shaped cross-section.

The seat belt upper mounting bracket may have a first length extending along the upper section and the seat belt lower mounting bracket may have a second length extending along the lower section.

The outer reinforcement may have a pair of flanges and the inner reinforcement may have a pair of flanges. The seat belt upper mounting bracket may have a pair of flanges and the seat belt lower mounting bracket may have a pair of flanges. The flanges of the outer reinforcement may be coupled to the flanges of the inner reinforcement, respectively.

The upper section may have a W-shaped cross-section including a central web and a pair of apexes located on both sides of the central web. The flanges of the seat belt upper mounting bracket may be coupled to the apexes of the upper section, respectively.

The lower section may have a W-shaped cross-section including a central web, a pair of apexes located on both sides of the central web, and a pair of extension portions extending from the apexes, respectively. The flanges of the seat belt lower mounting bracket may be coupled to the extension portions of the lower section, respectively.

The lower section may have a hat-shaped cross-section including a central web and a pair of extension portions extending from the central web. The flanges of the seat belt lower mounting bracket may be coupled to the extension portions of the lower section or the flanges of the lower section, respectively.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure has been excluded in order not to unnecessarily obscure the gist of the present disclosure.

Terms such as first, second, A, B, (a), and (b) may be used to describe the elements in embodiments of the present disclosure. These terms are only used to distinguish one element from another element. The intrinsic features, sequence or order, and the like of the corresponding elements are not limited by the terms. Unless otherwise defined, all terms used herein, including technical or scientific terms, have the same meanings as those generally understood by those with ordinary knowledge or skill in the field of art to which the present disclosure belongs. Such terms as those defined in a generally used dictionary are to be interpreted as having meanings equal to the contextual meanings in the relevant field of art Such terms are not to be interpreted as having ideal or excessively formal meanings unless clearly defined as having such in the present application.

Referring to FIGS. 1-4, a center pillar assembly 10 for a vehicle is disclosed according to an embodiment of the present disclosure. The center pillar assembly 10 may include an outer reinforcement 11 and an inner reinforcement 12 coupled to the outer reinforcement 11. The center pillar assembly 10 may also include a seat belt upper mounting bracket 13 and a seat belt lower mounting bracket 14 coupled to the inner reinforcement 12.

Figure 1:
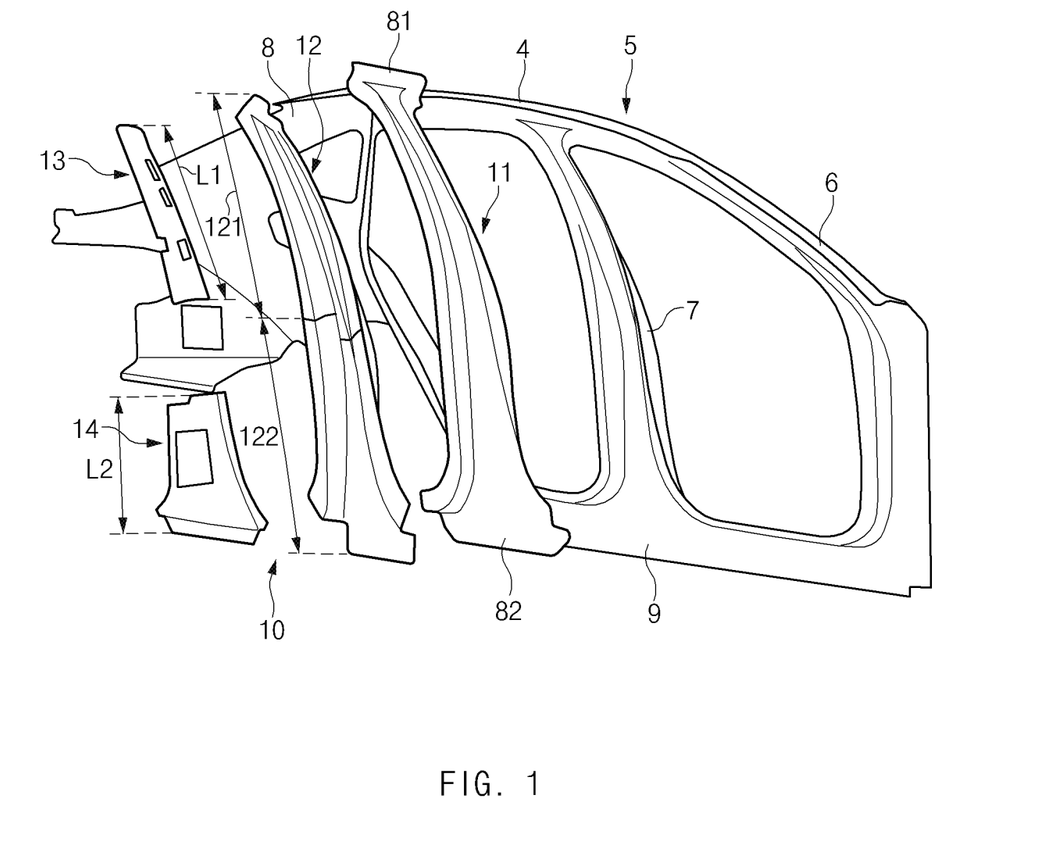
FIG. 1 illustrates an exploded perspective view of a center pillar assembly for a vehicle according to an embodiment of the present disclosure.
Figure 2:
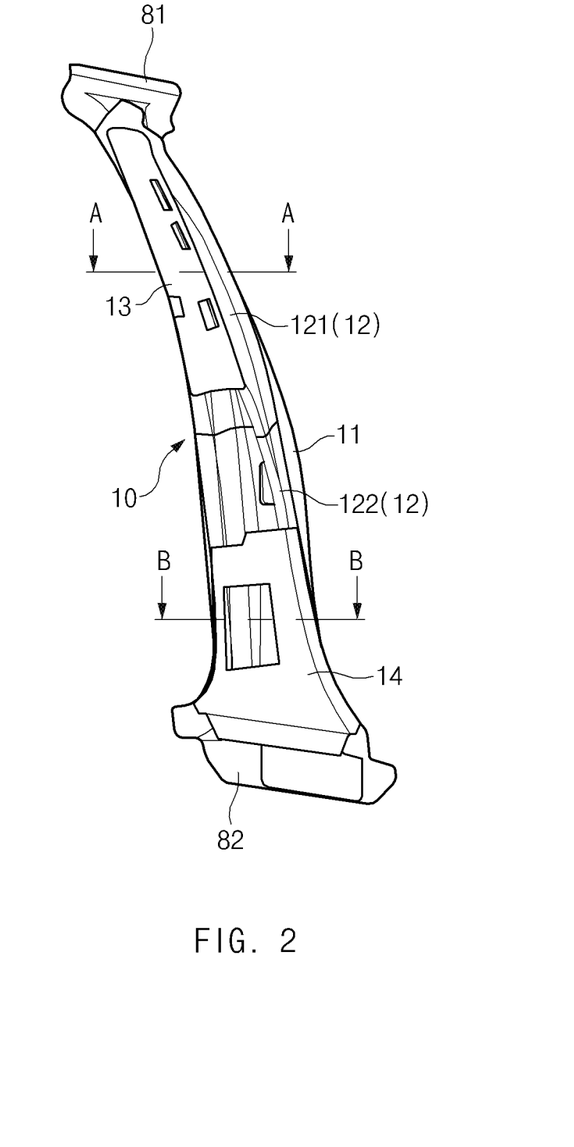
FIG. 2 illustrates a perspective view of a center pillar assembly for a vehicle according to an embodiment of the present disclosure.

The outer reinforcement 11 may be coupled to a side outer body 5 of a vehicle body by welding and/or the like. The side outer body 5 may include a roof side rail 4, a rocker 9, a front pillar portion 6, a center pillar portion 7, and a rear pillar portion 8. The front pillar portion 6, the center pillar portion 7, and the rear pillar portion 8 may extend between the roof side rail 4 and the rocker 9.

The outer reinforcement 11 may extend in a longitudinal direction of the center pillar portion 7 of the side outer body 5. The outer reinforcement 11 may be coupled to the center pillar portion 7 of the side outer body 5. The center pillar portion 7 may be a panel having an opening. A pair of flanges 7a and 7b may be formed individually on both side edges of the center pillar portion 7 adjacent to the opening.

The outer reinforcement 11 may have an upper coupling portion 81 integrally formed on a top end thereof and may have a lower coupling portion 82 integrally formed on a bottom end thereof. The upper coupling portion 81 may be coupled to a portion of the side outer body 5 where a top end of the center pillar portion 7 and the middle of the roof side rail 4 are connected. The lower coupling portion 82 may be coupled to a portion of the side outer body 5 where a bottom end of the center pillar portion 7 and the middle of the rocker 9 are connected. The outer reinforcement 11 may be a panel having an opening. A pair of flanges 11a and 11b may be formed individually on both side edges of the outer reinforcement 11 adjacent to the opening. The flanges 11a and 11b of the outer reinforcement 11 may be coupled to the flanges 7a and 7b of the center pillar portion 7 of the side outer body 5 by welding, respectively.

Figure 3:
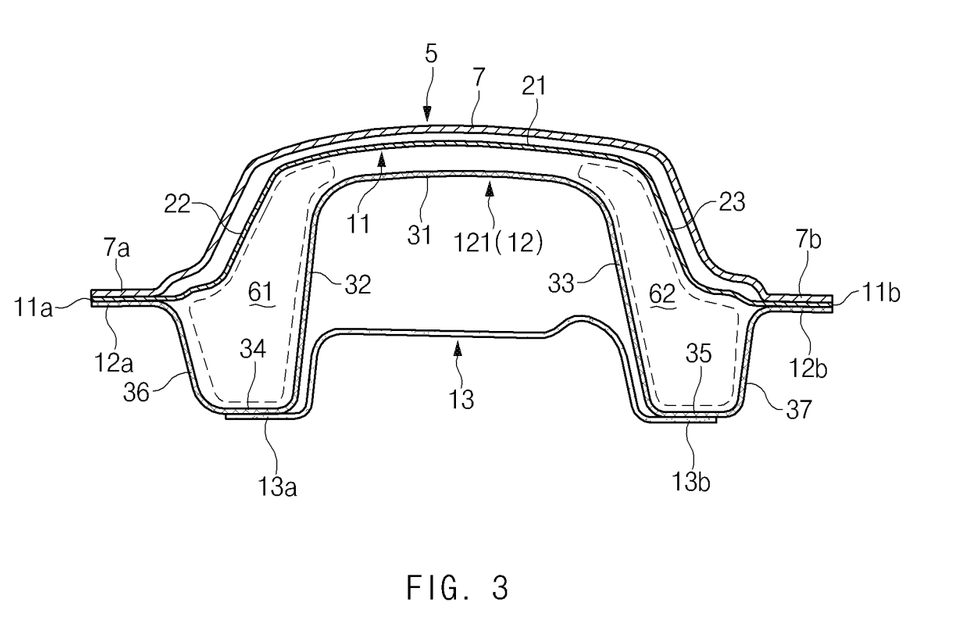
FIG. 3 illustrates a cross-sectional view taken along line A-A of FIG. 2.
Figure 4:
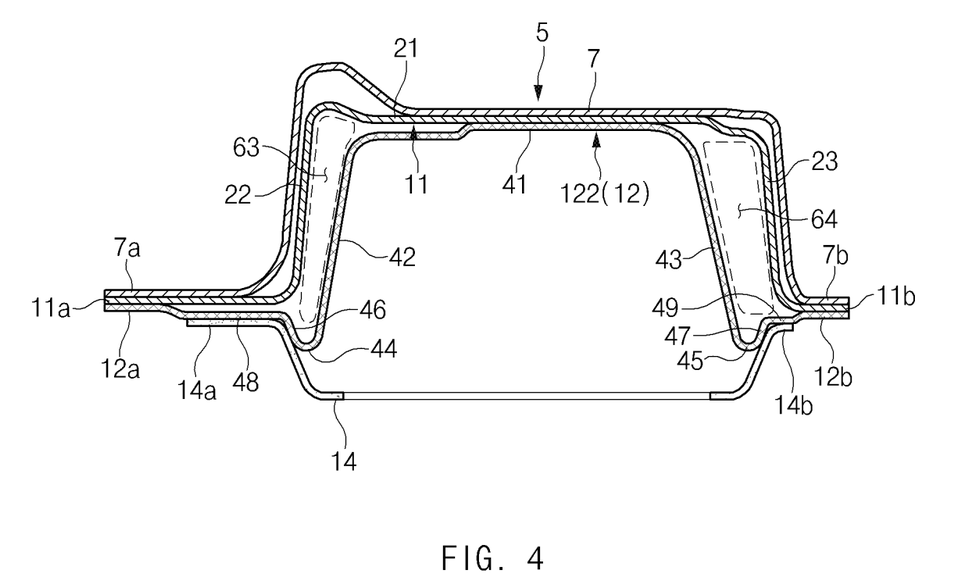
FIG. 4 illustrates a cross-sectional view taken along line B-B of FIG. 2.

Referring to FIGS. 3 and 4, the outer reinforcement 11 may have a hat-shaped cross-section. The hat-shaped cross-section of the outer reinforcement 11 may include a central web 21 and may include a first inner sidewall 22 and a second inner sidewall 23 individually connected to both sides of the central web 21. The flanges 11a and 11b may extend horizontally from the inner sidewalls 22 and 23, respectively. A width of the outer reinforcement 11 may gradually increase from the top end thereof to the bottom end thereof.

The inner reinforcement 12 may be a panel having an opening. A pair of flanges 12a and 12b may be formed individually on both side edges of the inner reinforcement 12 adjacent to the opening. The flanges 12a and 12b of the inner reinforcement 12 may be coupled to the flanges 11a and 11b of the outer reinforcement 11 by welding, respectively.

The inner reinforcement 12 may include an upper section 121 and a lower section 122. The upper section 121 may extend from a top end of the inner reinforcement 12 to the middle of the inner reinforcement 12. The lower section 122 may extend from the middle of the inner reinforcement 12 to a bottom end of the inner reinforcement 12. A width of the inner reinforcement 12 may gradually increase from the top end thereof to the bottom end thereof. Thus, an end surface of the lower section 122 may have a relatively greater width than an end surface of the upper section 121.

According to an embodiment, the lower section 122 may extend as one continuous piece from a bottom end of the upper section 121 along a longitudinal direction of the inner reinforcement 12. In other words, the upper section 121 and the lower section 122 may form a unitary one-piece structure in the longitudinal direction of the inner reinforcement 12. Thus, the end surface of the upper section 121 and the end surface of the lower section 122 may be continuous in the longitudinal direction of the inner reinforcement 12.

According to another embodiment, the upper section 121 and the lower section 122 may be two separate pieces. The bottom end of the upper section 121 and a top end of the lower section 122 may be coupled by welding, using fasteners, and/or the like.

Referring to FIG. 3, the upper section 121 of the inner reinforcement 12 may have a continuous W-shaped cross-section in the longitudinal direction thereof. The W-shaped cross-section of the upper section 121 may include a central web 31. A first inner sidewall 32 and a second inner sidewall 33 may be individually connected to both sides of the central web 31. The first inner sidewall 32 may extend vertically or obliquely from the central web 31 and a first apex 34 may extend horizontally from a lower end of the first inner sidewall 32. A first outer sidewall 36 may be spaced apart outward from the first inner sidewall 32 and the first outer sidewall 36 may extend vertically or obliquely from the first apex 34. The second inner sidewall 33 may extend vertically or obliquely from the central web 31 and a second apex 35 may extend horizontally from a lower end of the second inner sidewall 33. A second outer sidewall 37 may be spaced apart outward from the second inner sidewall 33 and the second outer sidewall 37 may extend vertically or obliquely from the second apex 35. The first and second apexes 34 and 35 may be a flat structure and the flanges 12a and 12b may extend horizontally from the outer sidewalls 36 and 37, respectively.

Referring to FIG. 3, the first inner sidewall 32 of the upper section 121 of the inner reinforcement 12 may be spaced apart from the first inner sidewall 22 of the outer reinforcement 11. Thus, a first closed cross-section cavity 61 may be formed between the first inner sidewall 32 of the inner reinforcement 12 and the first inner sidewall 22 of the outer reinforcement 11. The first closed cross-section cavity 61 may be defined by the first inner sidewall 32 of the inner reinforcement 12, the first apex 34 of the inner reinforcement 12, the first outer sidewall 36 of the inner reinforcement 12, and the first inner sidewall 22 of the outer reinforcement 11. The second inner sidewall 33 of the upper section 121 of the inner reinforcement 12 may be spaced apart from the second inner sidewall 23 of the outer reinforcement 11. Thus, a second closed cross-section cavity 62 may be formed between the second inner sidewall 33 of the inner reinforcement 12 and the second inner sidewall 23 of the outer reinforcement 11. The second closed cross-section cavity 62 may be defined by the second inner sidewall 33 of the inner reinforcement 12, the second apex 35 of the inner reinforcement 12, the second outer sidewall 37 of the inner reinforcement 12, and the second inner sidewall 23 of the outer reinforcement 11. The center pillar assembly 10 may have the first closed cross-section cavity 61 and the second closed cross-section cavity 62 symmetrically disposed between the outer reinforcement 11 and the upper section 121 of the inner reinforcement 12.

Referring to FIG. 4, the lower section 122 of the inner reinforcement 12 may have a continuous W-shaped cross-section in the longitudinal direction thereof. The W-shaped cross-section of the lower section 122 may include a central web 41 and may include a first inner sidewall 42 and a second inner sidewall 43 individually connected to both sides of the central web 41. The first inner sidewall 42 may extend vertically or obliquely from the central web 41 and a first outer sidewall 46 may be spaced apart outward from the first inner sidewall 42. A first apex 44 may connect a lower end of the first inner sidewall 42 and a lower end of the first outer sidewall 46. The first outer sidewall 46 may extend obliquely from the first apex 44 and a first extension portion 48 may extend horizontally from the first outer sidewall 46. The second inner sidewall 43 may extend vertically or obliquely from the central web 41 and a second outer sidewall 47 may be spaced apart outward from the second inner sidewall 43. A second apex 45 may connect a lower end of the second inner sidewall 43 and a lower end of the second outer sidewall 47. The second outer sidewall 47 may extend obliquely from the second apex 45 and a second extension portion 49 may extend horizontally from the second outer sidewall 47.

Referring to FIG. 4, the first inner sidewall 42 of the lower section 122 of the inner reinforcement 12 may be spaced apart from the first inner sidewall 22 of the outer reinforcement 11. Thus, a third closed cross-section cavity 63 may be formed between the first inner sidewall 42 of the lower section 122 of the inner reinforcement 12 and the first inner sidewall 22 of the outer reinforcement 11. The third closed cross-section cavity 63 may be defined by the first inner sidewall 42 of the inner reinforcement 12, the first apex 44 of the inner reinforcement 12, the first outer sidewall 46 of the inner reinforcement 12, and the first inner sidewall 22 of the outer reinforcement 11. A width of the central web 41 of the lower section 122 is greater than a width of the central web 31 of the upper section 121. Thus, a width of the third closed cross-section cavity 63 may be narrower than a width of the first closed cross-section cavity 61. The second inner sidewall 43 of the lower section 122 of the inner reinforcement 12 may be spaced apart from the second inner sidewall 23 of the outer reinforcement 11. Thus, a fourth closed cross-section cavity 64 may be formed between the second inner sidewall 43 of the inner reinforcement 12 and the second inner sidewall 23 of the outer reinforcement 11. The fourth closed cross-section cavity 64 may be defined by the second inner sidewall 43 of the inner reinforcement 12, the second apex 45 of the inner reinforcement 12, the second outer sidewall 47 of the inner reinforcement 12, and the second inner sidewall 23 of the outer reinforcement 11. The width of the central web 41 of the lower section 122 is greater than the width of the central web 31 of the upper section 121. Thus, a width of the fourth closed cross-section cavity 64 may be narrower than a width of the second closed cross-section cavity 62. The center pillar assembly 10 may have the third closed cross-section cavity 63 and the fourth closed cross-section cavity 64 symmetrically disposed between the outer reinforcement 11 and the lower section 122 of the inner reinforcement 12. Referring to FIGS. 3 and 4, the first closed cross-section cavity 61 and the third closed cross-section cavity 63 may be located on the left side. Also, the second closed cross-section cavity 62 and the fourth closed cross-section cavity 64 may be located on the right side. In particular, the third closed cross-section cavity 63 may be continuous with respect to the first closed cross-section cavity 61 in the longitudinal direction of the inner reinforcement 12. Also, the fourth closed cross-section cavity 64 may be continuous with respect to the second closed cross-section cavity 62 in the longitudinal direction of the inner reinforcement 12.

Figure 5:
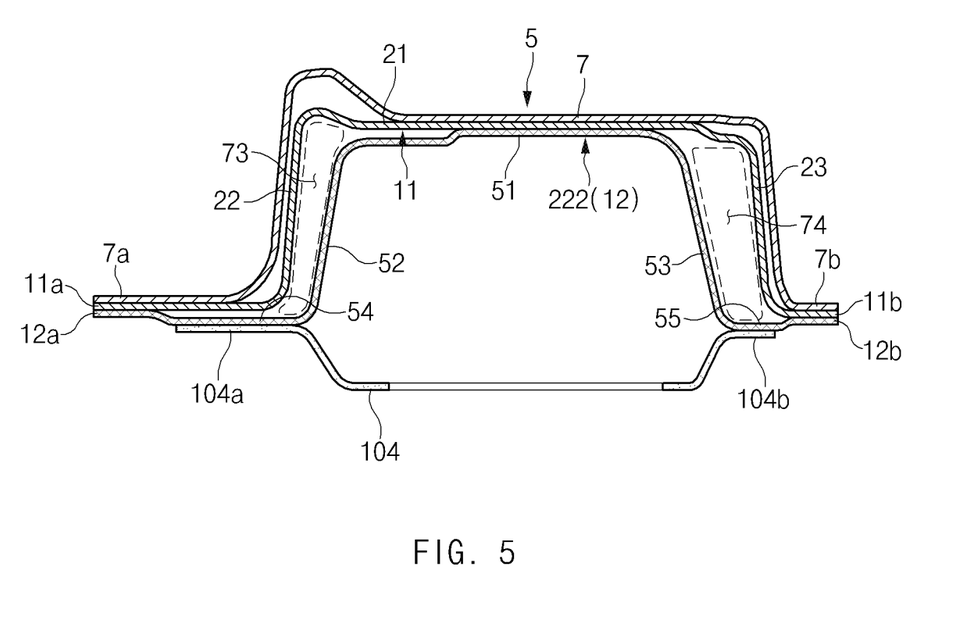
FIG. 5 illustrates a cross-sectional view according to a modified embodiment of FIG. 4.
Figure 6:
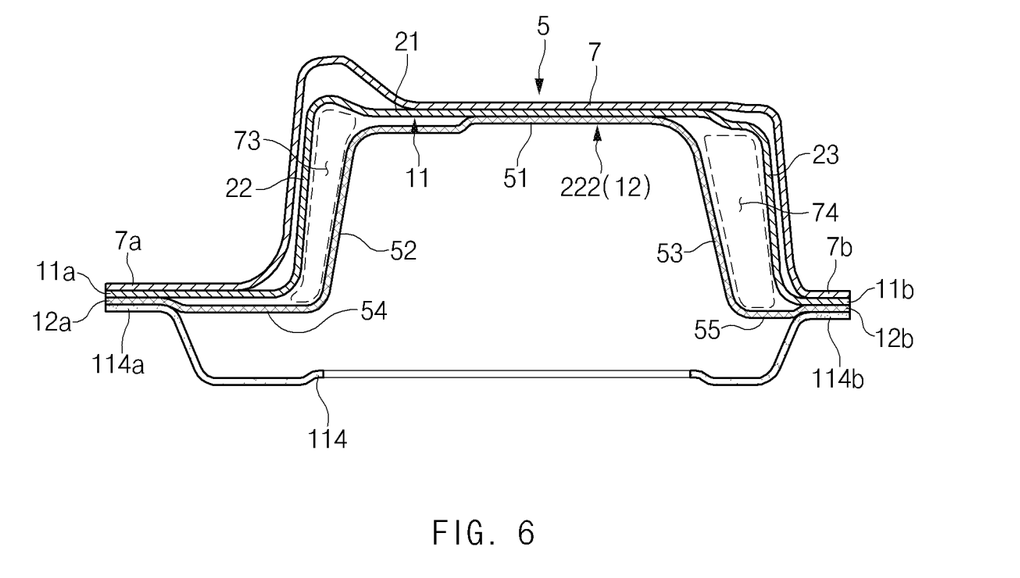
FIG. 6 illustrates a cross-sectional view according to another modified embodiment of FIG. 4.

FIGS. 5 and 6 illustrate cross-sectional views of a lower section 222 of the inner reinforcement 12 according to another embodiment of the present disclosure. Referring to FIGS. 5 and 6, the lower section 222 of the inner reinforcement 12 according to another embodiment of the present disclosure may have a hat-shaped cross-section. The hat-shaped cross-section of the lower section 222 may include a central web 51 and may include a first inner sidewall 52 and a second inner sidewall 53 individually connected to both sides of the central web 51. A first extension portion 54 may extend horizontally from a lower end of the first inner sidewall 52 and a second extension portion 55 may extend horizontally from a lower end of the second inner sidewall 53. The flanges 12a and 12b may be connected to the extension portions 54 and 55, respectively. The first inner sidewall 52 of the lower section 222 may be spaced apart from the first inner sidewall 22 of the outer reinforcement 11. Thus, a third closed cross-section cavity 73 may be defined by the first inner sidewall 52 of the lower section 222 and the first inner sidewall 22 of the outer reinforcement 11. The second inner sidewall 53 of the lower section 222 may be spaced apart from the second inner sidewall 23 of the outer reinforcement 11. Thus, a fourth closed cross-section cavity 74 may be defined by the second inner sidewall 53 of the lower section 222 and the second inner sidewall 23 of the outer reinforcement 11. The center pillar assembly 10 may have the third closed cross-section cavity 73 and the fourth closed cross-section cavity 74 symmetrically disposed between the outer reinforcement 11 and the lower section 222 of the inner reinforcement 12. Referring to FIGS. 3, 5, and 6, the first closed cross-section cavity 61 and the third closed cross-section cavity 73 may be located on the left side. Also, the second closed cross-section cavity 62 and the fourth closed cross-section cavity 74 may be located on the right side. In particular, the third closed cross-section cavity 73 may be continuous with respect to the first closed cross-section cavity 61. Also, the fourth closed cross-section cavity 74 may be continuous with respect to the second closed cross-section cavity 62.

According to an embodiment of the present disclosure, the first closed cross-section cavity 61 and the third closed cross-section cavity 63 or 73 may be continuous in the longitudinal direction of the inner reinforcement 12. The second closed cross-section cavity 62 and the fourth closed cross-section cavity 64 or 74 may be continuous in the longitudinal direction of the inner reinforcement 12.

Referring to FIG. 1, the seat belt upper mounting bracket 13 may extend in the longitudinal direction of the upper section 121 of the inner reinforcement 12. The seat belt upper mounting bracket 13 may have a first length L1 corresponding to that of the upper section 121 of the inner reinforcement 12. Referring to FIG. 3, the seat belt upper mounting bracket 13 may be a panel having an opening. A pair of flanges 13*a* and 13*b* may be formed individually on both side edges of the seat belt upper mounting bracket 13 adjacent to the opening. The flanges 13*a* and 13*b* of the seat belt upper mounting bracket 13 may be coupled to the apexes 34 and 35 of the inner reinforcement 12 by welding, using fasteners, and/or the like, respectively. The flanges 13*a* and 13*b* of the seat belt upper mounting bracket 13 are coupled to the apexes 34 and of the inner reinforcement 12, respectively. Thus, the flanges 7*a* and 7*b* of the center pillar portion 7 of the side outer body 5, the flanges 11*a* and 11*b* of the outer reinforcement 11, and the flanges 12*a* and 12*b* of the inner reinforcement 12 may be welded in three layers. In other words, a component corresponding to a pillar inner panel according to the related art may be removed from the embodiment of the present disclosure, so that the number of weld layers may be reduced. Thus, the welding operation may be simplified and the welding quality may be secured or achieved safely. In addition, securing the welding quality may have the secondary effects of improving workability and air-tightness of door weather strips assembled into the center pillar assembly 10.

Referring to FIG. 1, the seat belt lower mounting bracket 14 may extend in the longitudinal direction of the lower section 122 of the inner reinforcement 12. The seat belt lower mounting bracket 14 may have a second length L2 corresponding to that of the lower section 122 of the inner reinforcement 12. The second length L2 may be shorter than the first length L1. Referring to FIG. 4, the seat belt lower mounting bracket 14 may be a panel having an opening. A pair of flanges 14*a* and 14*b* may be formed individually on both side edges of the seat belt lower mounting bracket 14. The flanges 14*a* and 14*b* of the seat belt lower mounting bracket 14 may be coupled to the extension portions 48 and 49 of the lower section 122 by using fasteners, welding, and/or the like, respectively. The flanges 14*a* and 14*b* of the seat belt lower mounting bracket 14 are coupled to the extension portions 48 and 49 of the inner reinforcement 12, respectively. Thus, the flanges 7*a* and 7*b* of the center pillar portion 7 of the side outer body 5, the flanges 11*a* and 11*b* of the outer reinforcement 11, and the flanges 12*a* and 12*b* of the inner reinforcement 12 may be welded in three layers.

In other words, a component corresponding to a pillar inner panel according to the related art may be removed from the embodiment of the present disclosure, so that the number of weld layers may be reduced. Thus, the welding operation may be simplified and the welding quality may be secured or achieved safely. In addition, securing the welding quality may have the secondary effects of improving workability and air-tightness of door weather strips assembled into the center pillar assembly 10.

Referring to FIG. 5, a seat belt lower mounting bracket 104 according to another embodiment of the present disclosure is disclosed. The seat belt lower mounting bracket 104 may be a panel having an opening. A pair of flanges 104*a* and 104*b* may be formed individually on both side edges of the seat belt lower mounting bracket 104. The flanges 104*a* and 104*b* of the seat belt lower mounting bracket 104 may be coupled to the extension portions 54 and 55 of the lower section 222 by using fasteners, welding, and/or the like, respectively. The flanges 104*a* and 104*b* of the seat belt lower mounting bracket 104 are coupled to the extension portions 54 and 55 of the lower section 222, respectively. Thus, the flanges 7*a* and 7*b* of the center pillar portion 7 of the side outer body 5, the flanges 11*a* and 11*b* of the outer reinforcement 11, and the flanges 12*a* and 12*b* of the inner reinforcement 12 may be welded in three layers.

Referring to FIG. 6, a seat belt lower mounting bracket 114 according to another embodiment of the present disclosure is disclosed. The seat belt lower mounting bracket 114 may have a width greater than that of the central web 21 of the outer reinforcement 11. The seat belt lower mounting bracket 114 may be a panel having an opening. A pair of flanges 114*a* and 114*b* may be formed individually on both side edges of the seat belt lower mounting bracket 114. The flanges 114*a* and 114*b* of the seat belt lower mounting bracket 114 may be coupled to the flanges 12*a* and 12*b* of the inner reinforcement 12 by using fasteners, welding, and/or the like, respectively. The flanges 114*a* and 114*b* of the seat belt lower mounting bracket 114 are coupled to the flanges 12*a* and 12*b* of the inner reinforcement 12, respectively. Thus, the flanges 7*a* and 7*b* of the center pillar portion 7 of the side outer body 5, the flanges 11*a* and 11*b* of the outer reinforcement 11, the flanges 12*a* and 12*b* of the inner reinforcement 12, and the flanges 114*a* and 114*b* of the seat belt lower mounting bracket 114 may be welded in four layers.

Figure 7:
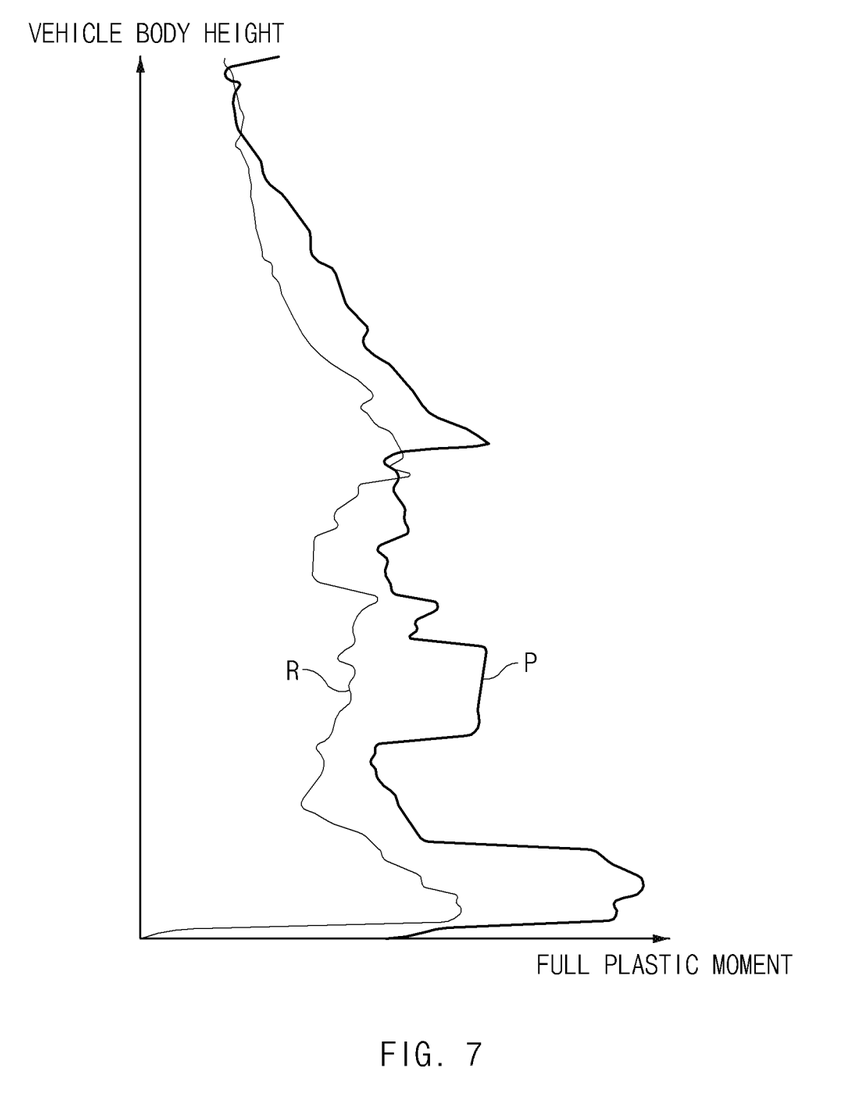
FIG. 7 illustrates a graph of full plastic moment according to a height of a vehicle.

FIG. 7 illustrates a graph of full plastic moment according to a height of a vehicle. As illustrated in FIG. 7, a full plastic moment P according to an embodiment of the present disclosure may be increased compared to a full plastic moment R according to the related art. In other words, the center pillar assembly 10 according to the embodiment of the present disclosure may be characterized in that the third closed cross-section cavity 63 or 73 may be continuous with respect to the first closed cross-section cavity 61 and the fourth closed cross-section cavity 64 or 74 may be continuous with respect to the second closed cross-section cavity 62 in the longitudinal direction of the inner reinforcement 12. Such a structure increases the full plastic moment compared to the related art. In particular, by sufficiently reinforcing the stiffness of the lower portion of the outer reinforcement 11 and the lower section 122 of the inner reinforcement 12 directly impacted during a side collision, impact stiffness may be significantly improved.

As set forth above, by removing a component corresponding to the pillar inner panel according to the related art, the center pillar assembly according to embodiments of the present disclosure may reduce the number of components, reduce the number of welds as well as simplifying a welded structure, and improve impact stiffness and roof strength.

Hereinabove, although the present disclosure has been described with reference to embodiments and the accompanying drawings, the present disclosure is not limited thereto. The embodiments and drawings may be variously modified and altered by those having ordinary skill in the art to which the present disclosure pertains without departing from the spirit and scope of the present disclosure claimed in the following claims.

What is claimed is:

1. A center pillar assembly for a vehicle, the center pillar assembly comprising:
    an outer reinforcement coupled to a side outer body of a vehicle body;
    an inner reinforcement coupled to the outer reinforcement, the inner reinforcement including an upper section and a lower section;
    a seat belt upper mounting bracket coupled to the upper section of the inner reinforcement; and
    a seat belt lower mounting bracket coupled to the lower section of the inner reinforcement,
    wherein the upper section includes a central web and has a pair of apexes located on both sides of the central web, and
    wherein flanges of the seat belt upper mounting bracket are coupled to the apexes of the upper section, respectively.

2. The center pillar assembly according to claim 1, wherein a first closed cross-section cavity and a second closed cross-section cavity are disposed between the upper section and the outer reinforcement,
    wherein a third closed cross-section cavity and a fourth closed cross-section cavity are disposed between the lower section and the outer reinforcement,
    wherein the third closed cross-section cavity is continuous with respect to the first closed cross-section cavity, and
    wherein the fourth closed cross-section cavity is continuous with respect to the second closed cross-section cavity.

3. The center pillar assembly according to claim 1, wherein the upper section and the lower section form a unitary one-piece structure in a longitudinal direction of the inner reinforcement.

4. The center pillar assembly according to claim 1, wherein the upper section and the lower section are two separate pieces.

5. The center pillar assembly according to claim 1, wherein the outer reinforcement has a hat-shaped cross-section.

6. The center pillar assembly according to claim 1, wherein the seat belt upper mounting bracket has a first length extending along the upper section, and
    wherein the seat belt lower mounting bracket has a second length extending along the lower section.

7. The center pillar assembly according to claim 1, wherein the outer reinforcement has a pair of flanges,
    wherein the inner reinforcement has a pair of flanges,
    wherein the seat belt upper mounting bracket has a pair of the flanges,
    wherein the seat belt lower mounting bracket has a pair of flanges, and
    wherein the flanges of the outer reinforcement are coupled to the flanges of the inner reinforcement, respectively.

8. The center pillar assembly according to claim 7, wherein the lower section includes a central web, a pair of apexes located on both sides of the central web, and a pair of extension portions extending from the apexes, respectively, and
    wherein the flanges of the seat belt lower mounting bracket are coupled to the extension portions of the lower section, respectively.

9. The center pillar assembly according to claim 7, wherein the lower section has a hat-shaped cross-section including a central web and has a pair of extension portions extending from the central web, and
    wherein the flanges of the seat belt lower mounting bracket are coupled to the extension portions of the lower section, respectively.

* * * * *